No. 728,600. PATENTED MAY 19, 1903.
L. NAUDET.
PROCESS OF EXTRACTING SUGAR CONSTITUENTS.
APPLICATION FILED JULY 27, 1900.
NO MODEL.

Fig. 1.
Fig. 2.

WITNESSES:
J. E. Pearson
Frank O'Connor

INVENTOR
Léon Naudet
BY
Geo. H. Benjamin
ATTORNEY

No. 728,600. Patented May 19, 1903.

UNITED STATES PATENT OFFICE.

LEON NAUDET, OF PARIS, FRANCE.

PROCESS OF EXTRACTING SUGAR CONSTITUENTS.

SPECIFICATION forming part of Letters Patent No. 728,600, dated May 19, 1903.

Application filed July 27, 1900. Serial No. 25,047. (No specimens.)

*To all whom it may concern:*

Be it known that I, LEON NAUDET, a citizen of the Republic of France, residing at Paris, France, (whose post-office address is 146 Boulevard Magenta, Paris,) have invented certain new and useful Improvements in Processes of Extracting the Sugar Constituents of Saccharine Bodies, of which the following is a specification.

My invention relates to a process for extracting the sugar constituent from divided portions of the sugar-beet, sugar-cane, or other sugar-bearing bodies.

The object of my invention is to obtain an increased yield of sugar from the sugar-bearing body and the production of a clear high-grade sugar-juice.

To accomplish the extraction of the sugar constituent of sugar-bearing bodies, diffusion-batteries have heretofore been employed, and these batteries have been operated in the following manner: A body of liquid—*i. e.*, water at the start, afterward the extracted sugar-juice—is caused to flow through a series of cells containing cut slices of the sugar-beet or divided portions of the sugar-cane or other material and through a series of heaters, the cells and heaters arranged alternately in series, so that the sugar-juice after passing a cell will be heated by the succeeding heater to a certain defined temperature—*i. e.*, between 75° and 80° centigrade—before being discharged into the next cell. The sugar-juice after passing through successive cells and heaters of the battery is introduced into a cell containing fresh material at the temperature of the atmosphere, and finally discharged from the battery as it leaves this cell. This mode of operation has been found objectionable, owing to the fact that when the juice heated at from 75° to 80° centigrade is introduced into the "cold cell" containing the cold materials the temperature of the juice is reduced to the mean between that of the juice and that of the cold mass, with the result that an imperfect extraction takes place of the sugar constituent of the material contained in such cold cell, and owing to the fact that in order to obtain the proper osmotic effect between the sugar contained in the cells of the material acted on and the sugar-juice brought in contact therewith the temperature must be above 75° centigrade and below 100° centigrade. A further objection to the mode of operation as described is found in the fact that when the sugar-juice leaves the cold cell its temperature has been so reduced that it becomes gummy, and a proper admixture of alkali employed prior to the delivery of the juice to the vessel for acid treatment or neutralization cannot be successfully accomplished.

In order to overcome the objections stated, as well as other objections, I have devised the following method of operation, which I will now describe.

My improved method differs from that described in that the material in the cold cell is first "mashed" by introducing hot sugar-juice and then heated by the forced circulation of such sugar-juice through it to approximately 77° centigrade before such cold cell is connected in series with the other cells of the battery as the last or delivery cell and the sugar-juice which has passed successively through the other cells of the battery sent through it. The practical effect of this change is that when the hot sugar-juice, which has traversed the other cells of the battery at a maintained temperature, reaches this last cell—*i. e.*, the cold cell—heated the temperature of the sugar-juice and that of the mashed material in the cell is approximately the same, which, as before stated, is the condition which experience has demonstrated to be the most favorable for osmosis and the extraction of the sugar constituent from the material acted upon. Further, the sugar-juice has been enriched and filtered in passing through the fresh material of the heated cold cell and leaves the cell at approximately the temperature of the cell, the juice as delivered from the battery, therefore, being in the condition best adapted for the subsequent treatment by liming, carbonization, &c.

To carry my invention into effect, I may make use of the following apparatus, which is illustrated in the accompanying drawings, and in which—

Figure 1 is an elevation of a series of diffuser-cells and heaters, an interposed pipe system, overflow-tank, and circulating-pump; Fig. 2, a plan view.

I wish it understood that I do not limit myself in any wise to the special apparatus illustrated, as it will be manifest that many different types of apparatus may be employed to carry out the process.

Referring to the drawings, 5 5ª 5ᵇ 5ᶜ indicate the diffuser-cells. Any number of cells may constitute a battery. Usually from ten to twelve cells are employed. These cells are shown as arranged in successive order. They may be arranged in any required order—as, for instance, in a circle, a square, or otherwise. Situated in proximity to each diffuser-cell is a heater 6. These heaters may be of any construction. I have shown the heater as supplied with a heating-coil 7, which is assumed to be connected to a source of steam. The diffuser-cells 5 5ª 5ᵇ 5ᶜ, &c., are assumed to contain a mass of divided material containing sugar constituents—such, for instance, as slices of the sugar-beet, portions of the sugar-cane, or other sugar-bearing material. It will be understood that the cells 5 5ª 5ᵇ 5ᶜ are adapted to be filled with fresh material in successive or other order, as desired, and that any one of these cells may be considered the last or cold cell of the series.

8 indicates a pipe through which water is introduced by means of the branch pipes 9 into the top of the cells 5 5ª 5ᵇ 5ᶜ, &c.; 10, valves in the pipe 8; 11, pipe into which the sugar-juice is discharged after passing through the cells 5 5ª 5ᵇ 5ᶜ, &c., and heater 6; 12, branch pipe between heaters 6 and pipe 11; 13, valves in pipe 11; 14, pipe interposed between the pipe 12 at the top of the heater and the top of the next cell in the series—as, for instance, between pipe 12 and cell 5ª; 15, valves in pipes 14; 16, overflow-tank, arranged at a sufficient height above the cells to balance the pressure of the liquid in any one of the cells when the forcing-pump is in operation; 17, pipe system interposed between pipes 9 at each cell and overflow-tank 16; 18, pipe connected to the induction-orifice of pump 19 and through branch pipes 20 to the top of each heater 6; 21, valves in pipes 20; 22, pipe connected between the eduction-orifice of pump 19 and the upper end of the supplemental heater 6ª; 23, pipe connected to the lower end of the supplemental heater 6ª and through branch pipes 24 with the top of the cells 5 5ª 5ᵇ 5ᶜ, &c.; 25, valves in pipes 24.

My improved mode of operation is as follows: Assuming the cell 5ª to have been cut out of circulation with the other cells, which can be effected by closing valve 10 in pipe 8, valve 15 in pipe 14, and valve 13 in pipe 11, and this cell to be the cold cell, into which a fresh mass of divided material has been introduced, and the cell filled with hot sugar-juice taken from the circulation, the ordinary circulation of the battery, exclusive of this cell, will be as follows: by pipe 8, through pipe 9, to top of cell 5, thence from bottom of cell 5, through heater 6, by pipe 12, pipe 11, (passing around, but not through the cell 5ª,) to pipe 12 of cell 5ᵇ, thence through heater 6, upward through cell 5ᵇ, thence by pipe 9, through pipe 8, by pipe 9, to top of cell 5ᶜ, from bottom of cell 5ᶜ, through heater 6, through pipe 12, and so on through the remaining cells of the battery, to be discharged into the usual measuring-tank. At this time the valves 21 25 in pipes 20 24, leading from the cold cell 5ª, are open. This puts this cell into the circuit of the pump 19, which being in operation draws the sugar-juice, which has become cold from contact with the cold material in the cell, from the bottom of the cell upward through the heater 6, thence by pipe 20 and pipe 18 to the induction-orifice of the pump 19, thence through the eduction-orifice of the pump to pipe 22, heater 6ª, pipe 23, pipe 24, to the top of the cell 5ª. The sugar-juice in passing through the heaters 6 and 6ª is raised to and maintained at the required temperature. In practice I prefer to cause the heated sugar-juice to be forced through the material in the cold cell three or more times in a downward direction or until the temperature of the material in the cell has been raised to approximately 77° centigrade. I do not limit myself, however, to the precise number of times that the fluid shall be circulated nor to the direction of the circulation. As the sugar-juice expands under the action of the heaters 6 6ª the surplus beyond the capacity of the cell 5ª is carried through pipe system 17 to the overflow-tank 16.

I have described my improved method of operation as carried out through the cell 5ª. Manifestly any one of the cells may be the final or cold cell and be included in a separate circuit with the pump 19 and supplemental heater 6ª.

It will be seen from the above statement that the material contained in the last cell, whichever it may be, is subjected to the action of juice of the required temperature to produce the best osmotic effects, and, further, that by circulating the juice under pressure through the material in the cell the juice is largely freed by filtration of all gummy or other materials which are objectionable in the juice when delivered from the diffusion apparatus.

In an ordinary diffusion process acting upon beets the sugar-juice leaving the diffuser is usually black in color. By my improved process the juice is delivered from the diffuser in a very much better condition, being bright and clear and at the temperature and in the condition required to be combined with the required alkali before carbonation treatment.

A further advantage of my improved method of operation is found in the fact that much less water is required to effect complete extraction of the sugar constituents from sugar-bearing bodies than is commonly employed, which fact is of great practical importance, as a smaller amount of fuel and less time is necessary to effect the vaporization of the contained water of the juice in the subsequent treatment.

Having thus described my invention, I claim—

1. A method of extracting the sugar constituent from saccharine bodies, which consists in causing a body of liquid at the required temperature to traverse a cell of a diffusion-battery containing a sugar-bearing body until such sugar-bearing body has been heated to approximately 77° centigrade, then coupling said cell in the circulation of the other cells of the battery and in such manner that it shall be the last cell of the series.

2. A method of extracting the sugar constituent from saccharine bodies, which consists in causing a body of liquid at the required temperature, to be circulated under pressure through a cell of a diffusion-battery containing a sugar-bearing body until such sugar-bearing body has been heated to approximately 77° centigrade, then coupling said cell in the circulation of the other cells of the battery, and in such manner that it shall be the last cell of the series.

3. A method of extracting the sugar constituent from saccharine bodies, which consists in causing a body of liquid at the required temperature to first traverse a series of cells of a diffusion-battery containing sugar-bearing bodies, then a cell containing a sugar-bearing body which has been heated to approximately the temperature of the circulating juice before being connected with the other cells of the series.

4. The diffusion method described for obtaining saccharine juices from bodies containing such materials, which consists in subjecting the materials to the action of a circulating fluid at a maintained temperature, successively cutting the respective cells of the battery out of circulation as the contained material is exhausted, filling said cut-out cell with fresh material, heating the material of said cell to approximately the temperature of the other cells of the battery, cutting this cell into the circulation of the battery, and finally drawing the rich saccharine juice from the battery through this last-introduced cell.

5. A step in the method described, which consists in heating a cold body of sugar-bearing material, contained in a cell forming a part of a diffusion-battery, to approximately the temperature of the liquid passing through the battery before coupling such cell in the circuit of the other cells.

In testimony whereof I have hereunto set my hand, in presence of two subscribing witnesses, this 17th day of July, 1900.

LEON NAUDET.

Witnesses:
 GEORGES DELOM,
 EDWARD P. MACLEAN.